Figures 1, 2, 5:
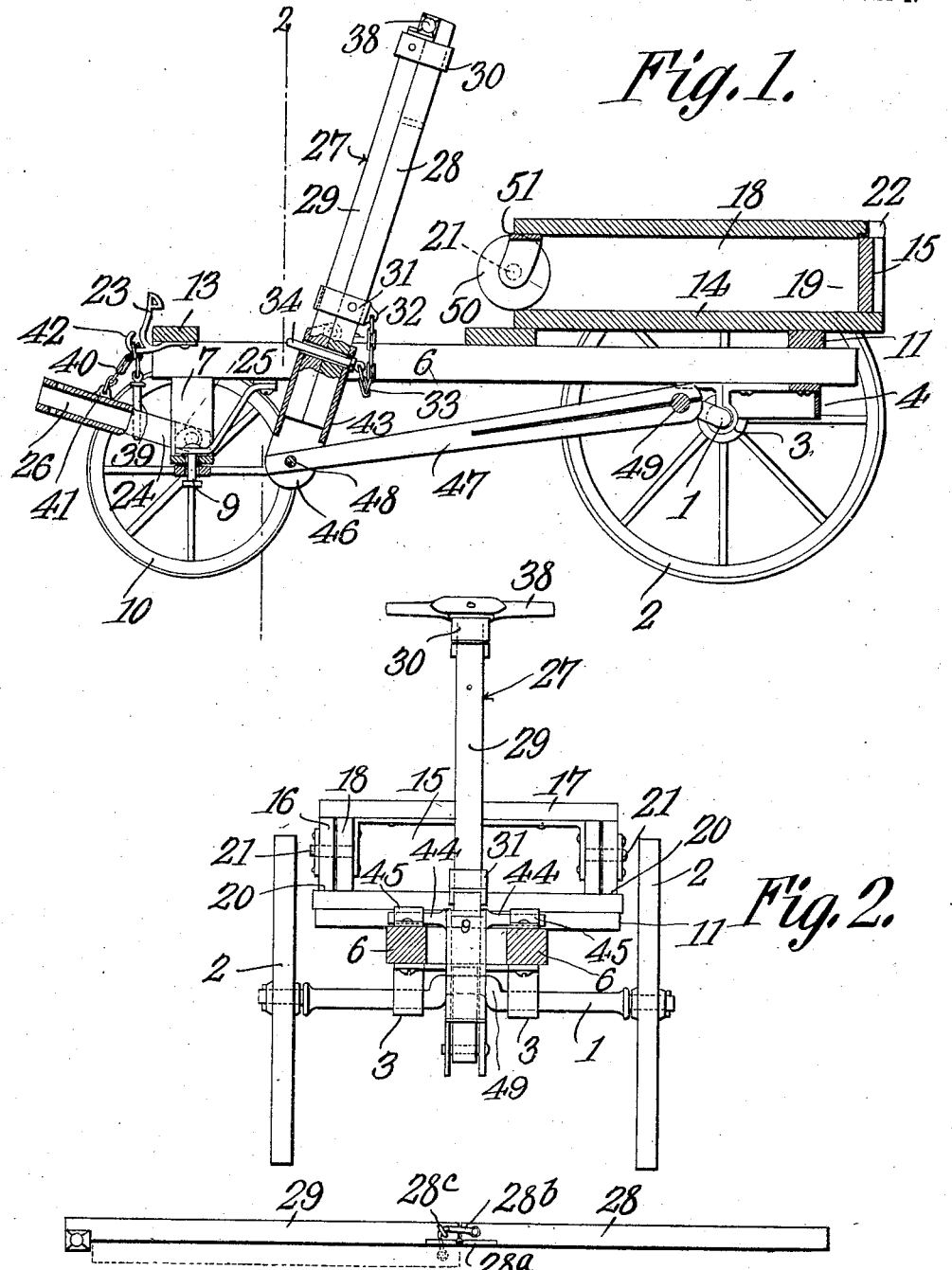

No. 858,223. PATENTED JUNE 25, 1907.
J. A. SHERRY.
EXPRESS WAGON.
APPLICATION FILED JULY 13, 1906.

2 SHEETS—SHEET 1.

WITNESSES:

James A. Sherry, INVENTOR.
By
ATTORNEYS

No. 858,223. PATENTED JUNE 25, 1907.
J. A. SHERRY.
EXPRESS WAGON.
APPLICATION FILED JULY 13, 1906.
2 SHEETS—SHEET 2.
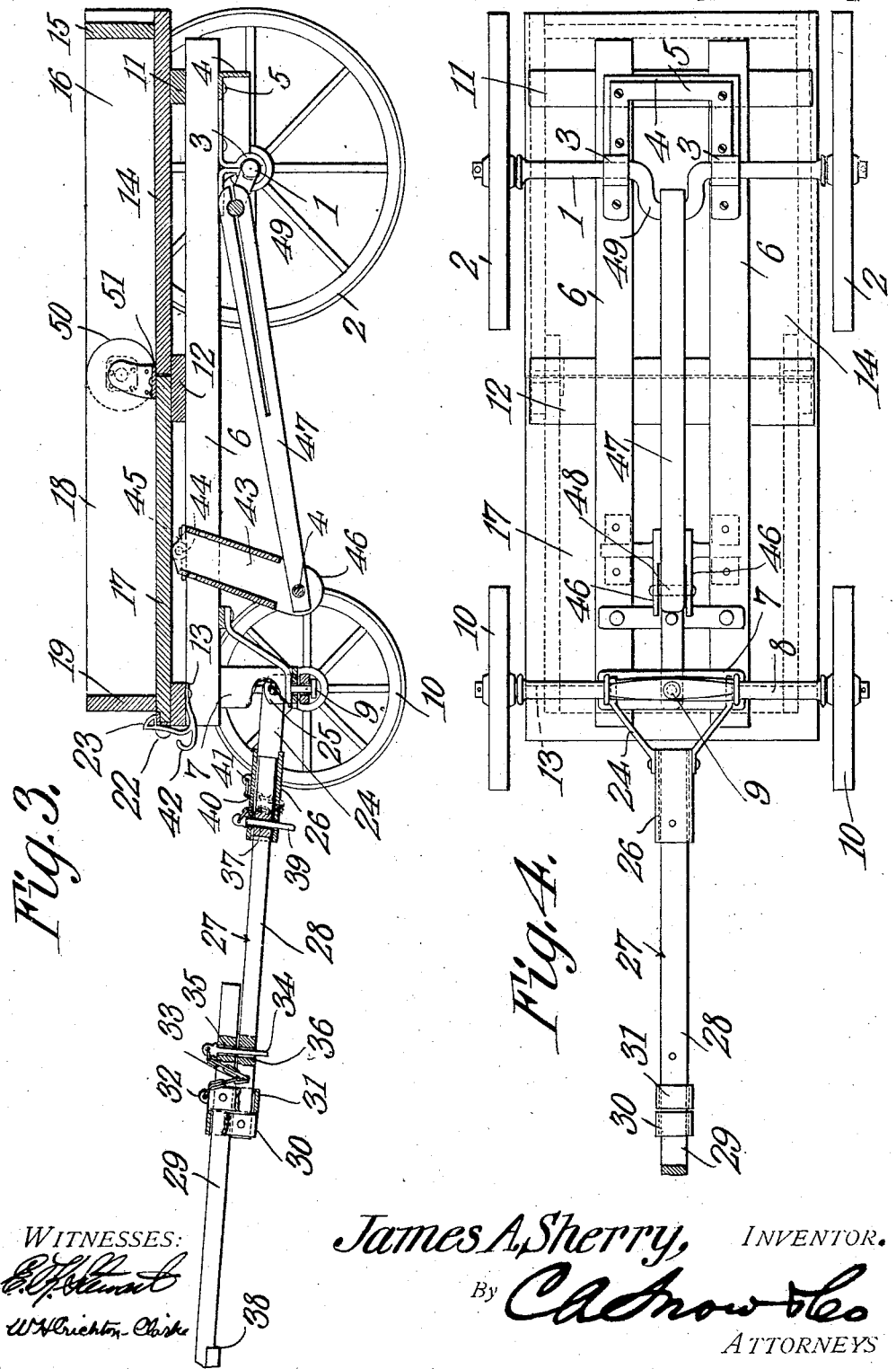
WITNESSES:
James A. Sherry, INVENTOR.
By C. A. Snow & Co.
ATTORNEYS

UNITED STATES PATENT OFFICE.

JAMES A. SHERRY, OF FALL RIVER, MASSACHUSETTS.

EXPRESS-WAGON.

No. 858,223.      Specification of Letters Patent.      Patented June 25, 1907.

Application filed July 13, 1906. Serial No. 326,126.

To all whom it may concern:

Be it known that I, JAMES A. SHERRY, a subject of the King of Great Britain, residing at Fall River, in the county of Bristol and State of Massachusetts, have invented a new and useful Express-Wagon, of which the following is a specification.

This invention relates to express wagons for children.

The object of the invention is to provide a strong, simple, durable, inexpensive and thoroughly efficient express wagon provided with an extensible body and adapted to be either drawn with the ordinary handle or to be easily and quickly converted into a hand-propelled vehicle.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of the following claims without departing from the spirit of the invention or sacrificing any of its advantages.

In the accompanying drawings forming part of this specification: Figure 1 is a vertical section, partly in elevation, of the improved wagon of this invention shown in condition to be propelled by hand. Fig. 2 is a transverse section on the line 2—2 of Fig. 1. Fig. 3 is a longitudinal vertical section, partly in elevation, showing the wagon arranged for ordinary use. Fig. 4 is an under plan view of the wagon as illustrated in Fig. 3. Fig. 5 is a detail view showing a modified form of handle.

Like reference numerals indicate corresponding parts in the different figures of the drawings.

The reference numeral 1 indicates a drive axle upon the ends of which are rigidly mounted the drive wheels 2. The drive axle 1 is rotatably journaled in bearings 3 connected with an approximately U-shaped bracket 4 which preferably is L-shaped in cross section so as to form upper flanges 5. Secured at their rear ends to the upper flanges 5 of the bracket 4 is a pair of longitudinally extending parallel sills 6. Secured to the forward ends of the sills 6 in any suitable manner is a supporting device or bracket 7 with which a guide axle 8 is pivotally connected by means of a king bolt 9. The guide axle 8 is provided with a pair of guide wheels 10.

Mounted upon the upper surface of the longitudinal sills 6 is a rear cross piece 11, an intermediate cross piece 12, and a forward cross piece 13. A rear body member 14 is rigidly mounted upon the rear cross piece 11 and extends at its forward end partly across the intermediate cross piece 12 to which it is rigidly secured in any suitable manner. The rear body member 14 is provided with a rear wall 15 and side walls 16. The front end of said rear body member 14 is open, as shown. A forward body member 17 rests normally upon the forward cross piece 13 and upon a portion of the intermediate cross piece 12, as shown, so that said cross piece 12 overlaps the joint between the forward body member 17 and the rear body member 14. The forward body member 17 is provided with side walls 18 and a forward wall 19, the rear end of said body member 17 being open, as shown. The side walls 18 of the forward body member 17 are set closer together than the side walls 16 of the rear body member 14 so as to form ledges 20 at the side edges of the forward body member. The side walls 18 of the forward body member 17 are pivotally connected with the side walls 16 of the rear body member 14 by means of pivot pins 21 which extend through the side walls 16 and 18 about midway between the upper and lower edges thereof, so that when the forward end of the body member 17 is lifted, said member can be tilted backward so as to cause it to fold upon the rear body member 14, it being understood that the side walls 18 and forward wall 19 of the forward body member 17 will fit snugly within the side walls 16 and rear wall 15 of the rear body member 14. When the member 17 is thus folded upon the member 14, the walls 15 and 16 of the rear member will bear at their upper ends against the under surface of the ledges 20 and the walls 18 and 19 of the member 17 will bear at their lower ends against the upper surface of the rear body member 14 so that all these walls will securely brace each other to form a compact and strong seat for the child who is propelling the wagon. The under surface of the forward body member 17 preferably is finished in a smooth and attractive manner so that it will afford a comfortable and neat seat when the body member 17 is folded backward upon the member 14. The forward body member 17 preferably is formed in its forward edge with a notch 22 adapted to be engaged by a spring catch 23 mounted upon the forward cross piece 13, the function of this catch being to hold the forward body member 17 securely in position so as to prevent the same from being accidentally raised or from rattling when the express wagon is being drawn in the ordinary manner and it is not desired to propel the same by hand-power.

The preferred means for drawing the wagon along the ground in the ordinary way consists of a yoke 24 which is pivotally connected with the ears 25 on the guide axle 8. Rigidly secured to the yoke 24 in any suitable manner is a socket or connecting member 26. Detachably fitted into the socket or connecting member 26 is a handle which is indicated generally by 27 and consists of a rear section 28 and forward section 29 slidably connected with each other by means of the sleeves 30 and 31. The sleeve 30 is rigidly secured to the rear section 28 and slidably embraces the forward section 29, as shown. The sleeve 31 is rigidly secured to the forward section 29 and slidably embraces the rear section 28, as shown, said sleeve 31 being provided with an eye 32 to which is attached a cord 33 connected with a retaining pin 34. The forward section 29 preferably is provided in its rear end with a perforation 35 which is adapted to register with either the perforation 36 in the forward end of the rear section 28, or the perforation 37 in the rear end of said rear section 28. By means of the retaining pin 34, the sections 28 and 29 can be locked in proper position with respect to each other. At its forward end the section 29 preferably is provided with a transverse gripping piece 38.

From the foregoing description, it will be apparent that the handle which I prefer to use is provided with means for varying the length and thickness thereof, so that when it is desired to use the same for drawing the wagon, it can be extended to its full length and, consequently, decreased in thickness so as to render it light, and when it is desired to use the same as a lever for operating the propelling mechanism of the wagon, as will hereafter appear, it can be decreased in length and thickened so as to increase its strength and adapt it for the purpose in view.

The rear section 28 of the handle, when in extended position, is adapted to be fitted into the socket or connecting member 26 and to be detachably held therein by means of a retaining pin 39 provided with a cord 40 secured to an eye 41 on said socket 26. When the handle 27 is detached from the socket or connecting member 26, and it is no longer necessary to use said socket, the cord 40 is engaged with a hook 42 mounted upon the spring catch 23 so as to hold the socket or connecting member 26 in raised position.

The propelling mechanism for the express wagon preferably consists of a socket or connecting member 43 which is located beneath the forward body member 17 and is provided at its upper end with oppositely extending trunnions 44 journaled in bearings 45 on the longitudinal sills 6. At its lower end the socket or connecting member 43 is provided with spaced lugs 46 between which a link 47 is pivotally held upon a pin 48. The rear end of the link 47 is suitably connected with a crank portion 49 formed upon the drive axle 1, as shown.

When it is desired to propel the improved wagon by hand, the handle 27 is detached from the socket 26, as previously described, and is decreased in length and thickened in the manner described by adjusting the sections 28 and 29 upon each other. The forward body member 17 is then disengaged from the catch 23 and folded back upon the rear body member 14, as shown. The handle is then fitted into the socket or connecting member 43 and is secured therein by passing the retaining pin 34 through the lower end of said handle and through a pair of perforations in the upper end of said socket or connecting member 43. The socket member 26 upon the drive axle is then held in raised position by engaging the cord 40 with the hook 42. The child who desires to propel the vehicle sits upon the upper surface of the forward body member 17 and propels the wagon by rocking the handle 27. The guiding of the vehicle is accomplished by the feet of the child, which are placed upon opposite ends of the guide axle 8 on opposite sides of the yoke 24.

The meeting ends of the side walls 16 and 18 of the body members 14 and 17 preferably are rounded, as indicated at 50, so as to present an ornamental appearance when the wagon is being propelled by hand. Furthermore, the forward body member 17 preferably is provided inside the walls 18 thereof with an approximately U-shaped overlapping member 51 which when the forward body member 17 is folded forward, is adapted to overlap the upper surface of the forward edge of the rear body member 14 so as to conceal the joint between the two members.

In some cases the rear and front sections 28 and 29 of the extensible handle can be hinged or pivotally connected with each other, as indicated at 28$^a$, in which case a hook or catch 28$^b$, adapted to engage an eye 28$^c$, will be employed for holding the sections in extended position.

The improved express wagon of this invention is strong, simple, durable and inexpensive in construction as well as thoroughly efficient in operation.

What is claimed is:

1. A wagon having a rear body member, a forward body member connected with said rear body member, and propelling mechanism located partly under said forward body member and having a removable handle.

2. A wagon having a rear body member provided with side walls, and a forward body member having side walls pivotally connected with the side walls of said rear body member.

3. A wagon having a rear body member provided with side walls, a forward body member having side walls pivotally connected with the side walls of the rear body member, and an overlapping member connected with one of said body members for covering the joint therebetween.

4. A wagon having a rear body member provided with side walls, a forward body member having side walls pivotally connected with the side walls of the rear body member, a cross piece for covering the lower end of the joint between said body members, and an overlapping member for covering the upper portion of the joint between said body members.

5. A wagon having a rear body member provided with side walls having rounded forward ends, and a forward body member provided with side walls having rounded rear ends pivotally connected with the forward ends of the side walls of the rear body member.

6. A wagon having longitudinally extending sills, rear, intermediate and forward cross pieces on said sills, a rear body member connected with said rear and intermediate cross pieces, a forward body member pivotally connected with said rear body member and adapted normally to rest upon said intermediate and forward cross pieces and to be folded rearward upon said rear body member, and propelling mechanism located partly beneath said forward body member.

7. A wagon having longitudinal sills, rear, intermediate and forward cross pieces upon said sills, a rear body member connected with said rear and intermediate cross pieces, a forward body member pivotally connected with said rear body member and adapted to rest normally upon said intermediate and forward cross pieces, and a catch mounted upon said forward cross piece and adapted to hold said forward body member normally in position.

8. A wagon having a drive axle provided with drive wheels, a U-shaped bracket, L-shaped in cross section, connected with said drive axle, a pair of longitudinal sills connected with said U-shaped bracket, a guide axle pivotally connected with said longitudinal sills at the forward ends thereof, guide wheels upon said guide axle, a yoke pivotally connected with said guide axle and having a socket, a handle adapted to be connected with said socket and consisting of rear and forward sections slidably connected with each other, a retaining pin for securing the rear section of said handle in the socket of said yoke, a second retaining pin for holding said sections in extended position, a second socket pivotally mounted between said sills and having a crank connection with said drive axle, said second socket being adapted to receive said extensible handle and having perforations to receive said second retaining pin for securing the handle in position, a rear body member mounted upon said sills and having side walls, a forward body member having side walls pivotally connected with the side walls of the rear body member, and a catch for locking the said forward body member in its forward position.

In testimony that I claim the foregoing as my own, I have hereto affixed my signature in the presence of two witnesses.

JAMES A. SHERRY.

Witnesses:
E. HUME TALBERT,
C. E. DOYLE.